United States Patent
Linke et al.

(10) Patent No.: US 11,027,477 B2
(45) Date of Patent: Jun. 8, 2021

(54) METHOD AND DEVICE FOR PRODUCING A CONTAINER FILLED WITH FILLING MEDIUM

(71) Applicant: KHS Corpoplast GmbH, Hamburg (DE)

(72) Inventors: Michael Linke, Hamburg (DE); Rolf Baumgarte, Ahrensburg (DE); Michael Litzenberg, Geesthacht (DE)

(73) Assignee: KHS Corpoplast GmbH, Hamburg (DE)

( * ) Notice: Subject to any disclaimer, the term of this patent is extended or adjusted under 35 U.S.C. 154(b) by 1036 days.

(21) Appl. No.: 15/104,235

(22) PCT Filed: Mar. 16, 2015

(86) PCT No.: PCT/EP2015/000574
§ 371 (c)(1),
(2) Date: Jun. 13, 2016

(87) PCT Pub. No.: WO2015/144295
PCT Pub. Date: Oct. 1, 2015

(65) Prior Publication Data
US 2016/0318230 A1    Nov. 3, 2016

(30) Foreign Application Priority Data

Mar. 27, 2014    (DE) ..................... 10 2014 004 354.1

(51) Int. Cl.
*B29C 49/06*    (2006.01)
*B29C 49/12*    (2006.01)
(Continued)

(52) U.S. Cl.
CPC .............. *B29C 49/46* (2013.01); *B29C 49/12* (2013.01); *B29C 49/18* (2013.01); *B29C 49/36* (2013.01);
(Continued)

(58) Field of Classification Search
CPC . B29C 49/12; B29C 2049/1228; B29C 49/18; B29C 2049/4626; B67C 3/10
(Continued)

(56) References Cited

U.S. PATENT DOCUMENTS 3,694,424 A * 9/1972 Hunkar .................. B29C 49/66
264/526
3,804,133 A * 4/1974 Copping .................. B67C 3/10
141/37
(Continued)

FOREIGN PATENT DOCUMENTS

EP    0870594 A1    10/1998

*Primary Examiner* — Thanh K Truong
*Assistant Examiner* — Patrick B Fry
(74) *Attorney, Agent, or Firm* — Rankin, Hill & Clark LLP

(57) ABSTRACT

The invention relates to a method for producing a container (2) filled with a liquid product in which a preform (1) consisting of a thermoplastic material is stretched after a thermal conditioning with a stretching rod (11) and is shaped in an inflation process to the container (2), wherein the inflation process comprises a pre-blowing phase in which a fluid of a first pressure level is used for the inflation, and comprises a main blowing phase in which a fluid of a second pressure level that is greater than the first pressure level is used for the inflation and is characterized in that the fluid used in the pre-blowing phase is a blowing gas and that the fluid used in the main blowing phase is the product. Furthermore, the invention relates to a device for carrying out a method according to the invention.

10 Claims, 7 Drawing Sheets

Figure 1:
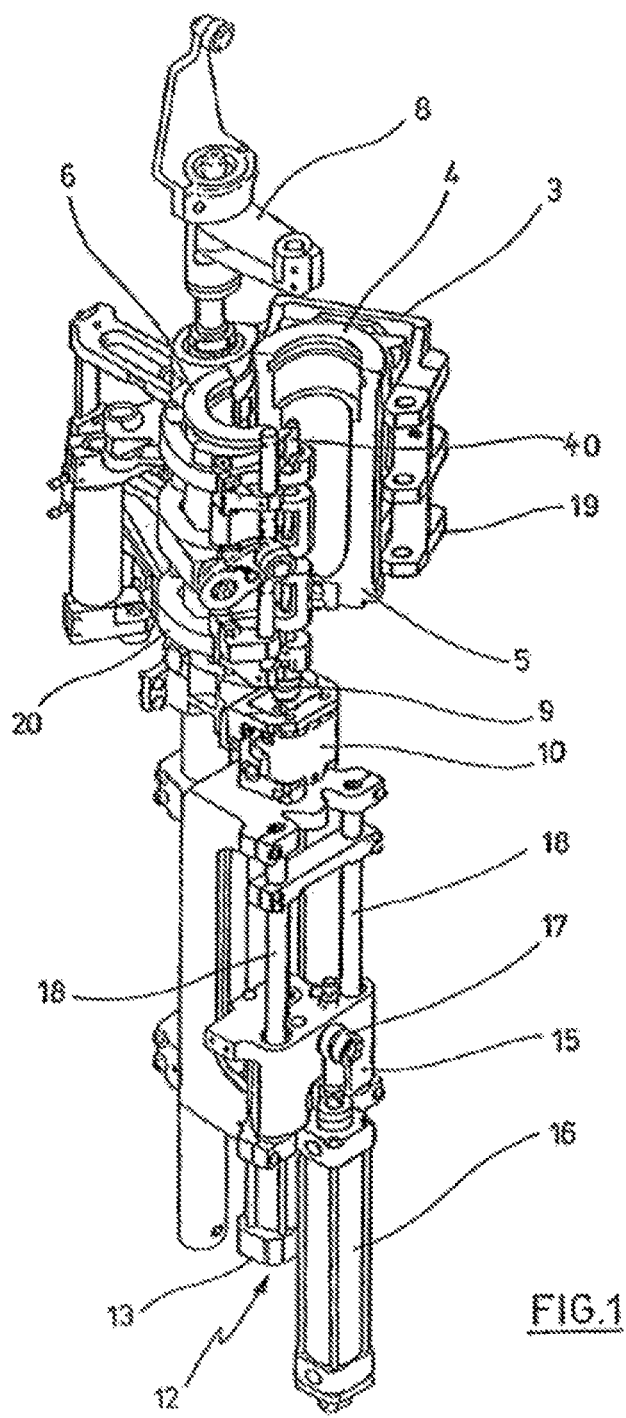

(51) Int. Cl.
*B29C 49/18* (2006.01)
*B29C 49/46* (2006.01)
*B29C 49/64* (2006.01)
*B29K 67/00* (2006.01)
*B65B 3/02* (2006.01)
*B29C 49/36* (2006.01)
*B29L 31/00* (2006.01)

(52) U.S. Cl.
CPC .......... *B29C 49/6409* (2013.01); *B65B 3/022* (2013.01); *B29C 49/06* (2013.01); *B29C 49/64* (2013.01); *B29C 2049/1228* (2013.01); *B29C 2049/1233* (2013.01); *B29C 2049/1257* (2013.01); *B29C 2049/1271* (2013.01); *B29C 2049/465* (2013.01); *B29C 2049/4626* (2013.01); *B29K 2067/003* (2013.01); *B29L 2031/7158* (2013.01)

(58) Field of Classification Search
USPC .................................................. 53/574; 141/6
See application file for complete search history.

(56) References Cited

U.S. PATENT DOCUMENTS

| | | | | |
|---|---|---|---|---|
| 3,862,284 | A * | 1/1975 | Dixon | B29C 49/46 264/526 |
| 3,969,455 | A * | 7/1976 | Moller | B29C 49/00 264/512 |
| 3,985,156 | A * | 10/1976 | Walker | F16K 1/305 137/637.2 |
| 4,039,641 | A * | 8/1977 | Collins | B29C 49/0005 264/28 |
| 4,076,071 | A | 2/1978 | Rosenkranz | |
| 4,827,965 | A * | 5/1989 | Wates | B01F 3/028 137/114 |
| 4,830,810 | A * | 5/1989 | Ufer | B29C 49/46 264/40.1 |
| 4,850,850 | A * | 7/1989 | Takakusaki | B29C 49/4205 425/526 |
| 5,346,386 | A | 9/1994 | Albrecht | |
| 5,648,026 | A | 7/1997 | Weiss | |
| 6,294,115 | B1 * | 9/2001 | Blizard | B29C 44/08 264/45.9 |
| 6,463,964 | B2 * | 10/2002 | Clusserath | B67C 3/065 141/104 |
| 8,864,490 | B2 * | 10/2014 | Fevre | B29C 49/46 425/524 |
| 9,259,887 | B2 * | 2/2016 | Fevre | B29C 49/46 |
| 2004/0173949 | A1 * | 9/2004 | Storione | B29C 49/18 264/529 |
| 2006/0097417 | A1 | 5/2006 | Emmer | |
| 2010/0204819 | A1 * | 8/2010 | Monin | B29C 49/58 700/197 |
| 2011/0094186 | A1 | 4/2011 | Chauvin | |
| 2011/0135778 | A1 | 6/2011 | Andison | |
| 2011/0215509 | A1 * | 9/2011 | Wauters | B29C 49/46 264/572 |
| 2012/0138192 | A1 * | 6/2012 | Campi | B67C 3/04 142/6 |
| 2013/0113143 | A1 | 5/2013 | Fevre | |
| 2013/0122136 | A1 | 5/2013 | Fevre | |
| 2013/0307197 | A1 * | 11/2013 | Haesendonckx | B29C 49/46 264/524 |

\* cited by examiner

METHOD AND DEVICE FOR PRODUCING A CONTAINER FILLED WITH FILLING MEDIUM

The invention relates to a method for producing a container filled with a liquid product in which a preform consisting of a thermoplastic material is stretched after a thermal conditioning with a stretching rod and is shaped in an inflation process to the container, wherein the inflation process comprises a pre-blowing phase in which a fluid of a first pressure level is used for the inflation, and comprises a main blowing phase in which a fluid of a second pressure level that is greater than the first pressure level is used for the inflation.

Furthermore, the invention relates to a device for producing a container filled with a liquid product and comprising a heating device for the thermal conditioning of preforms consisting of a thermoplastic material and comprising a blowing device for shaping a thermally conditioned preform to a container, wherein the blowing device comprises a blowing mold for receiving a preform, a stretching rod for stretching the preform located in the blowing mold and supply means for introducing blowing liquids into an inner hollow space of the preform located in the blowing mold.

In a container shaping by the action of blowing pressure preforms consisting of a thermoplastic material, for example, preforms consisting of PET (polyethylene terephthalate) are supplied in a blowing machine to different processing stations. Such a blowing machine typically comprises a heating device and a blowing device in whose area the previously tempered preform is expanded to a container by biaxial orientation.

The expansion takes place with the aid of compressed air which is introduced into the preform to be expanded. The process-related course in such an expansion of the preform is explained in DE-OS 43 40 291. The introduction of the compressed air mentioned in the beginning also comprises the introduction of compressed air into the developing container bubble and the introduction of compressed air into the preform at the beginning of the blowing process.

It proved to be advantageous to subdivide the blowing process into several phases. For example, it is known to subdivide the blowing process into a pre-blowing phase with a lower pressure level of the compressed air and into a main blowing phase with a higher pressure level of the compressed air.

The basic construction of a blowing station for container shaping is described in DE-OS 42 12 583. Possibilities for tempering of the preforms are explained in DE-OS 23 52 926.

According to a typical processing method the blowing-shaped containers produced as above are supplied to a subsequent filling device and filled there with the provided product. As a rule, therefore, a separate blowing machine and a separate filling machine are used. It is also already known that a separate blowing machine and a separate filling machine can be directly coupled to one another, making available a so-called interlocked blowing-filling device.

As a result of the two separate machines, a relatively large space requirement and a relatively long processing time result for corresponding systems and which are composed of the duration of the blowing process, the duration of the filling process and transfer times between the individual and interlocked machines.

An alternative known attempt is based on the shaping of the container by the product to be filled itself. An appropriately tempered preform is inserted to this end into a suitable mold and subsequently the liquid product is introduced into the preform and into the container bubble developing from this preform. The container bubble is widened out here until a complete resting on the inner contour of the mold has been achieved and the container has been filled. Such a method is also designated as a hydraulic shaping method. In a container shaping by the filling medium itself only one machine is needed which has, however, increased complexity to this end. Moreover, in a blowing process with a liquid it is difficult to create controlled and reproducible conditions, in particular because the preform surface cools off upon contact with the liquid. Accordingly, it had previously not been sufficiently successful to achieve a desired distribution of material in the walls of the finished containers.

Starting from this prior art, the invention has the problem of making available an alternative method for the production of containers filled with liquid product, wherein in particular the cited disadvantages of known solutions should be reduced.

This problem is solved by a method for producing a container filled with a liquid product, in which a preform consisting of a thermoplastic material is stretched after a thermal conditioning by a stretching rod and is shaped in an inflation process to the container, wherein the inflation process comprises a pre-blowing phase in which a fluid of a first pressure level is used for the inflation, and comprises a main blowing phase in which a fluid of a second pressure level that is greater than the first pressure level is used for the inflation, wherein the method in accordance with the invention is further developed in that the fluid used in the pre-blowing phase is a blowing gas and that the Fluid used in the main blowing phase is the product.

A significant advantage of the invention is that the pre-blowing phase takes place with a blowing gas so that hardly any cooling of the preform material takes place upon contact with the blowing fluid. As a result, during the pre-blowing phase a material distribution of the preform material that can be purposefully influenced, in particular along a longitudinal axis of the preform which corresponds to the direction of the stretching process comprised in the pre-blowing phase is achieved. Another advantage of the invention is that the pre-blowing phase is based on very well-understood processes and years of experience.

Another advantage of the invention consists in that in the main blowing phase a rapid cooling off of the container by the liquid product is achieved, as a result of which, in comparison to traditional blowing methods in which the cooling takes place by pressing the container on the cold blowing mold, a significantly more efficient cooling and as a result a shortening of the main blowing phase is achieved. In addition, transfer time to a separate filler and the filling time are eliminated.

Another advantage of the invention is that a supply of compressed gas with average pressures is required only for the pre-blowing phase whereas the constructively complex and therefore expensive supplying with highly compressed air such as is required in traditional gas blowing processes is eliminated.

On the whole, the processing time compared to standard blowing methods with blowing gas and a separate filling are significantly shortened by the invention, wherein in comparison to known liquid blowing methods a significantly better process control, in particular a significantly improved distribution of the material is achieved.

The blowing gas is introduced, for example, through a slot in the area of a mouth section of the preform or of the developing container bubble and/or through an inner hollow space of the stretching rod into an inner hollow space of the preform or of the developing container bubble.

This slot is, for example, an annular slot surrounding the stretching rod or a flat slot that results during the withdrawing of the stretching rod in the area of the mouth section of the preform or of the developing container bubble or of the finished container.

The mouth section is in particular the area of a preform which is not deformed during the production of the container. In particular, the mouth section of the preform therefore corresponds to the mouth section of the container bubble developing from the preform and to the mouth section of the finished container obtained from the container bubble.

The product is introduced, for example, through a slot in the area of a mouth section of the preform or of the developing container bubble and/or through an inner hollow space of the stretching rod into an inner hollow space of the preform or of the developing container bubble.

If blowing gas and product are introduced via separate introductory paths, for example, blowing gas via the slot and product via the hollow stretching rod or vice versa, no lines or line sections through which both fluids alternately flow are advantageously required.

If a fluid is introduced simultaneously via both introductory paths, i.e., via the slot and also via the hollow stretching rod, the special advantage of an elevated cross section of flow results and therefore in particular in the case of the product of an increased maximally achievable volume flow.

At least a part of the blowing gas supplied during the pre-blowing phase advantageously remains in the container until the conclusion of the main blowing phase. The blowing gas is further compressed because the product is made available according to the invention under a higher pressure.

As a result of the remaining of blowing gas up to the complete shaping of the container, in particular the cycle time is minimized because the main blowing phase can directly follow the pre-blowing phase without an intercalated relaxing of the pressure of the developing container bubble. Another advantage is that the container comprises a gas-filled head space and therefore the running out of product is reduced during the further handling of the finished, filled container.

An advantageous further development of the invention is characterized in that the blowing gas contains a settable amount of carbon dioxide. This results in the main blowing phase in a carbonization of the product in that carbon dioxide ($CO_2$) is separated out of the blowing gas under pressure in the product. The degree of carbonization, in particular the amount of separated $CO_2$ in the product can be influenced by the settable amount of the $CO_2$ in the blowing gas, wherein a higher amount of $CO_2$ in the blowing gas also has the consequence of a higher degree of carbonization.

The container is advantageously closed after the conclusion of the main blowing phase, wherein the container is in particular not removed from the blowing form until it has been closed. This significantly simplifies the handling of filled container, in particular the taking out from blowing mold and the subsequent removal because in particular no losses of the product, which are always possible, can occur during the handling of open containers.

The problem at the base of the invention is furthermore solved by a device for producing a container filled with a liquid product comprising a heating device for the thermal conditioning of preforms consisting of a thermoplastic material and comprising a blowing device for shaping a thermally conditioned preform to a container, wherein the blowing device comprises a blowing mold for receiving a preform, a stretching rod for stretching the preform located in the blowing mold and supply means for introducing blowing fluids into an inner hollow space of the preform located in the blowing mold, wherein the device of the invention is further developed in that the supply means comprises a first supply line designed to supply a gas and a second supply line designed to supply a liquid.

The device according to the invention is especially suited and designed to carry out a previously described method in accordance with the invention.

The blowing device advantageously comprises a blowing nozzle for sealing a preform located in the blowing mold, in particular for sealing an inner hollow space of the preform, wherein the inner hollow space of the preform can be connected or is connected in a flow-conducting manner by the blowing nozzle to the first line and/or to the second line.

To this end, for example, the blowing nozzle is set on the mouth area of a preform located in the blowing mold. For the case that the preform is transported by a transport pin, the blowing nozzle preferably grasps the transport pin, wherein the transport pin comprises a conduit for supplying the fluid made available by the blowing nozzle into the preform or the developing container bubble.

In another embodiment of the invention the stretching rod is constructed to be hollow, wherein an inner hollow space of a preform located in the blowing mold can be connected or is connected in a flow-conducting manner to the first supply line and/or to the second supply line.

An especially preferred further development of the invention is characterized in that the device furthermore comprises a switching valve to which the first supply line and the second supply line are connected on the input side and a third supply line is connected on the output side, wherein the third supply line is constructed to supply gases as well as to supply liquids, and wherein an inner hollow space of a preform located in the blowing mold is connected or can be connected in a flow-conducting manner to the third supply line in particular by the blowing nozzle and/or by the hollow stretching rod. This makes it possible in particular to alternately introduce gas and liquid into a preform or into the developing container bubble via an introductory path, for example, a blowing nozzle or a hollow stretching rod.

Figure 9:
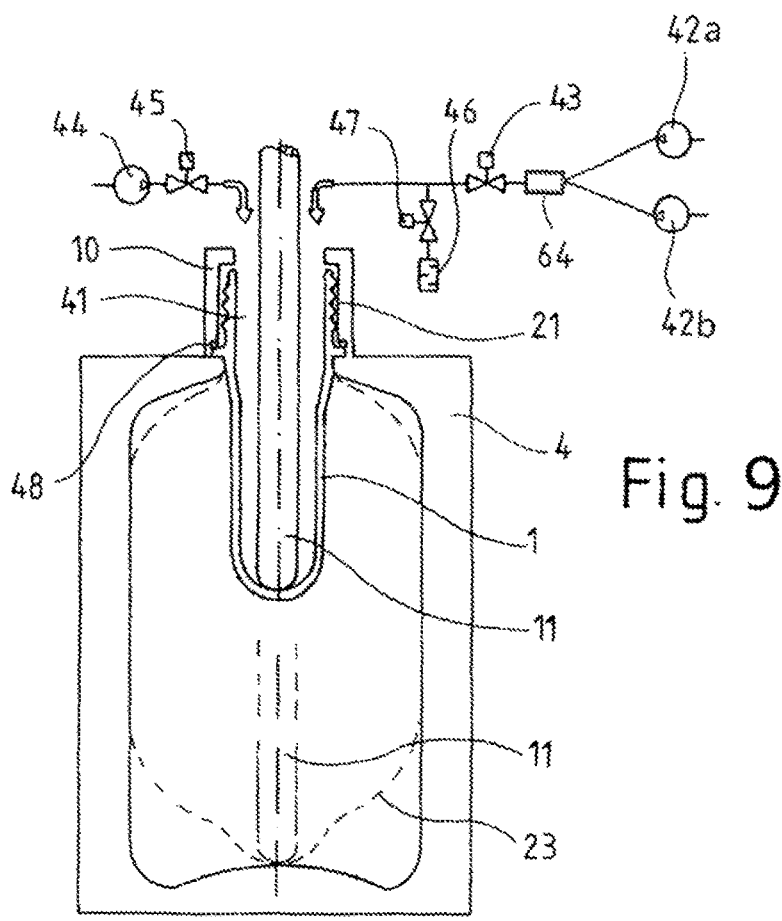

Furthermore, it is preferred in the scope of the invention if the device also comprises (as shown in FIG. 9) supply means connected in a flow-conducting manner to the first supply line for making a blowing gas available, wherein the supply means comprises a mixing device (64) for making available a gas mixture comprising gases from at least two different gas sources (42a, 42b).

Moreover, it is preferred if the device furthermore comprises a closing device for closing a container filled with product, especially for closing a container located in the blowing mold.

A device in accordance with the invention can also comprise several preferably similar blowing devices which are arranged, for example, on a rotating blowing wheel. Several blowing devices can also share individual features in the scope of the invention, for example, common supply lines for supplying gas and/or liquid to a plurality of blowing devices.

Figure 2:
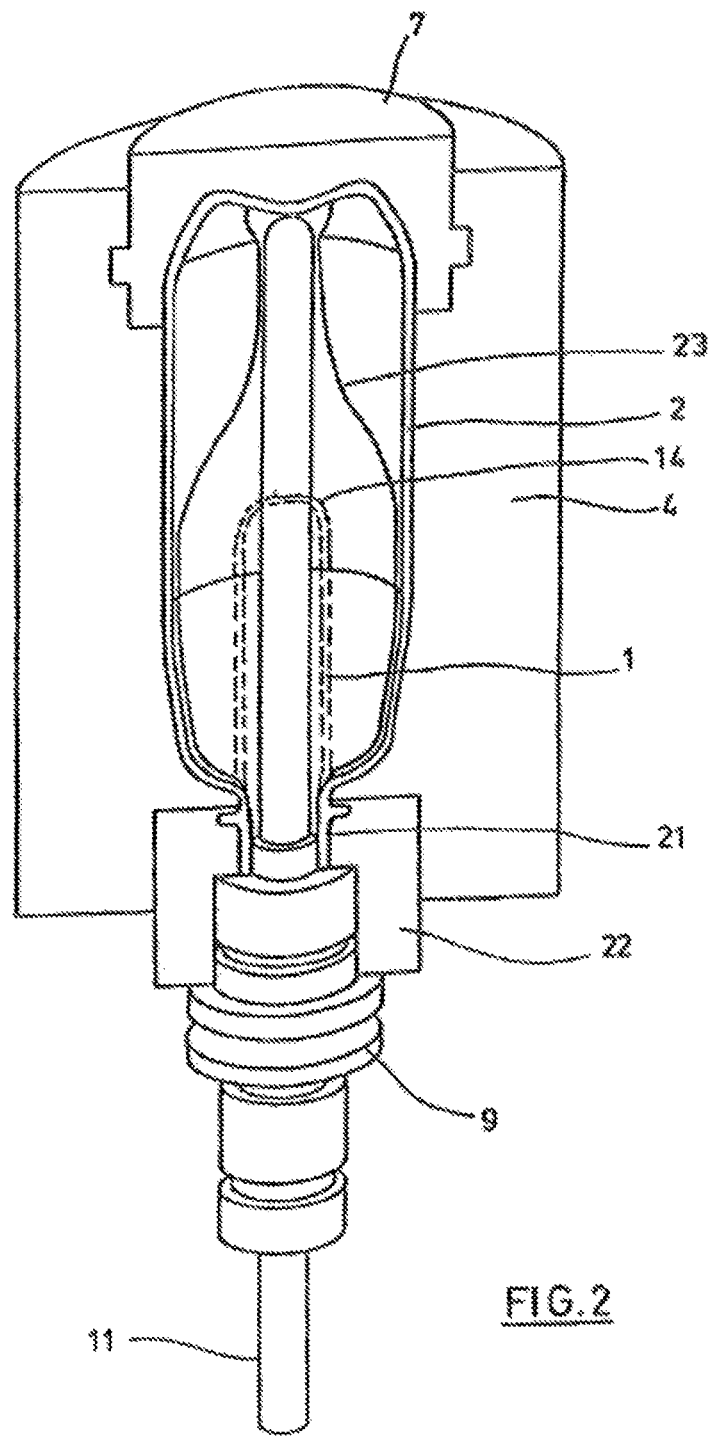
Figure 3:
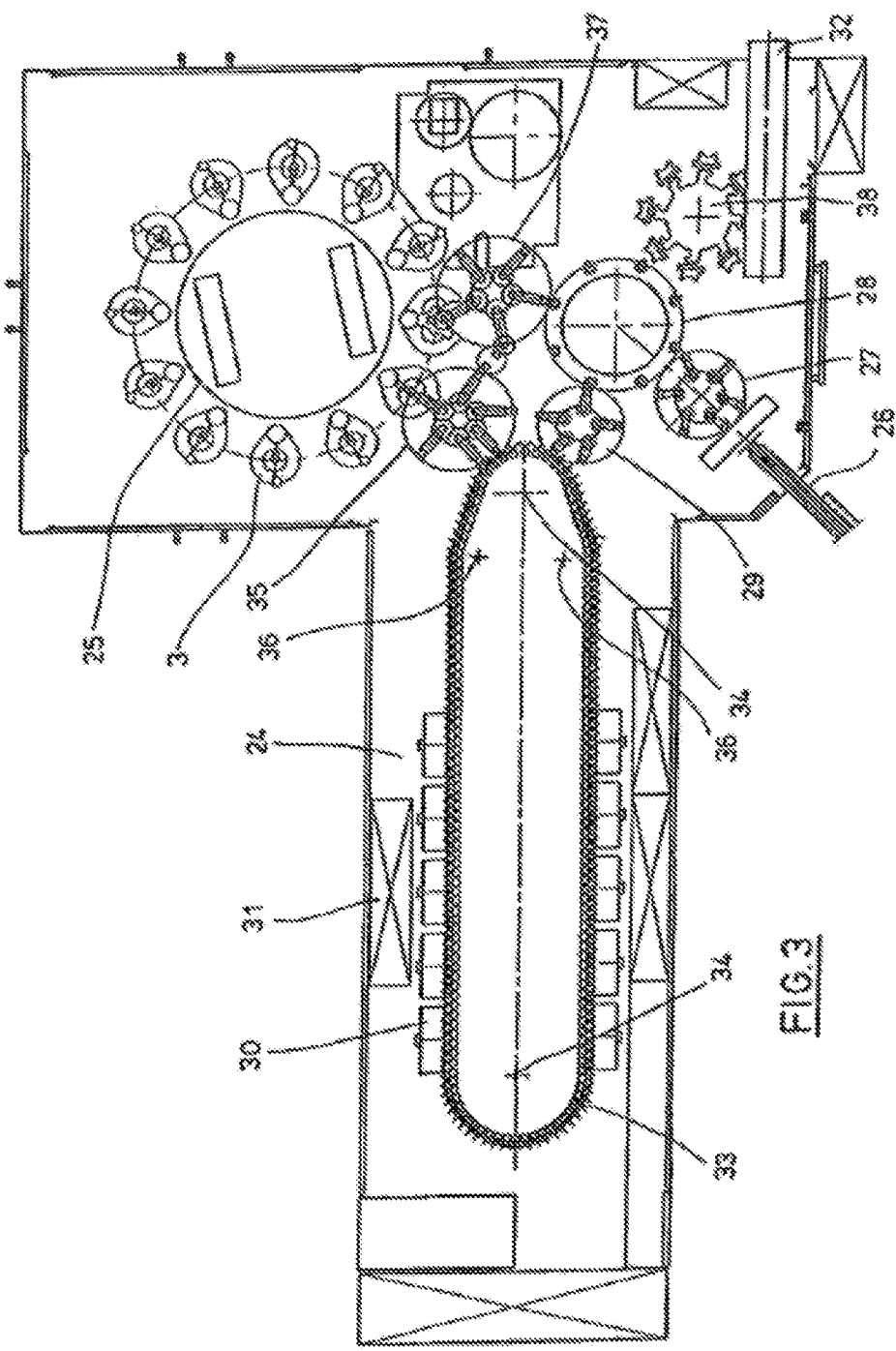
Figure 4:
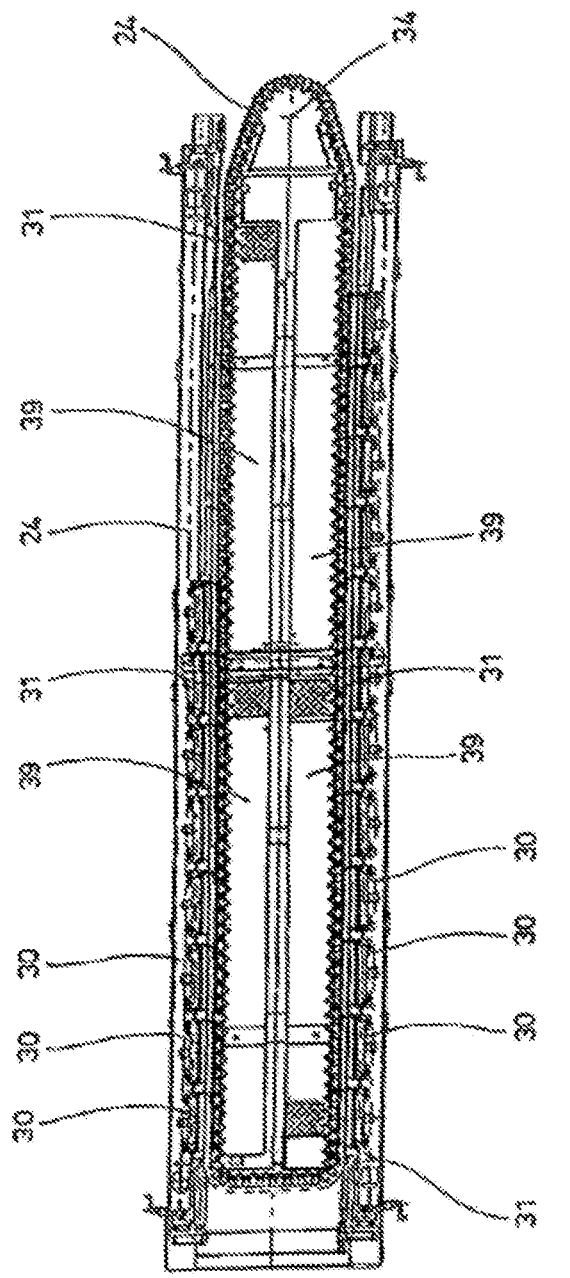
Figure 5:
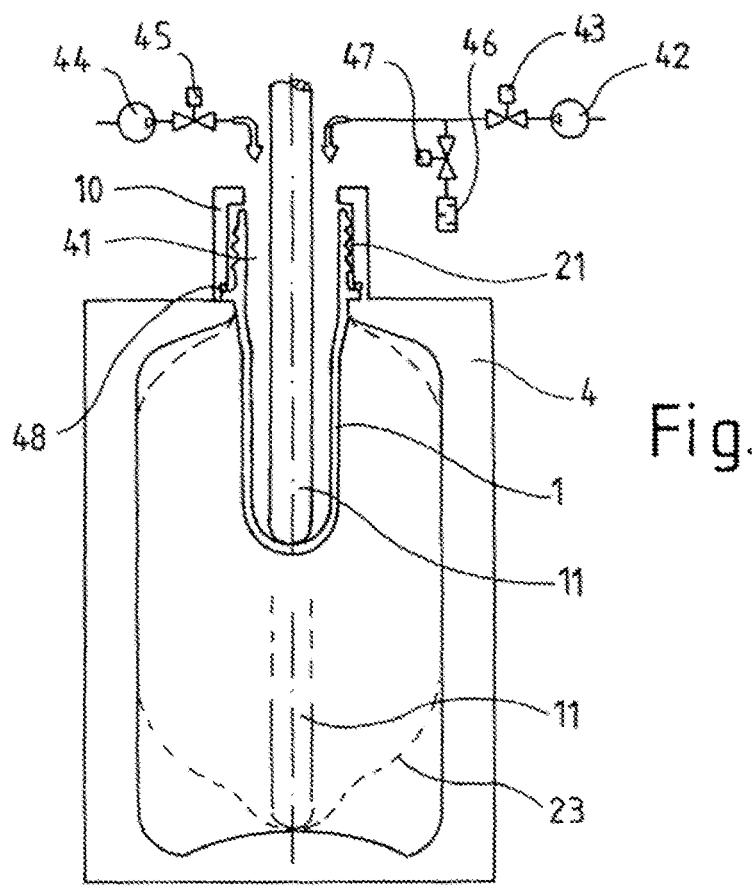
Figure 6:
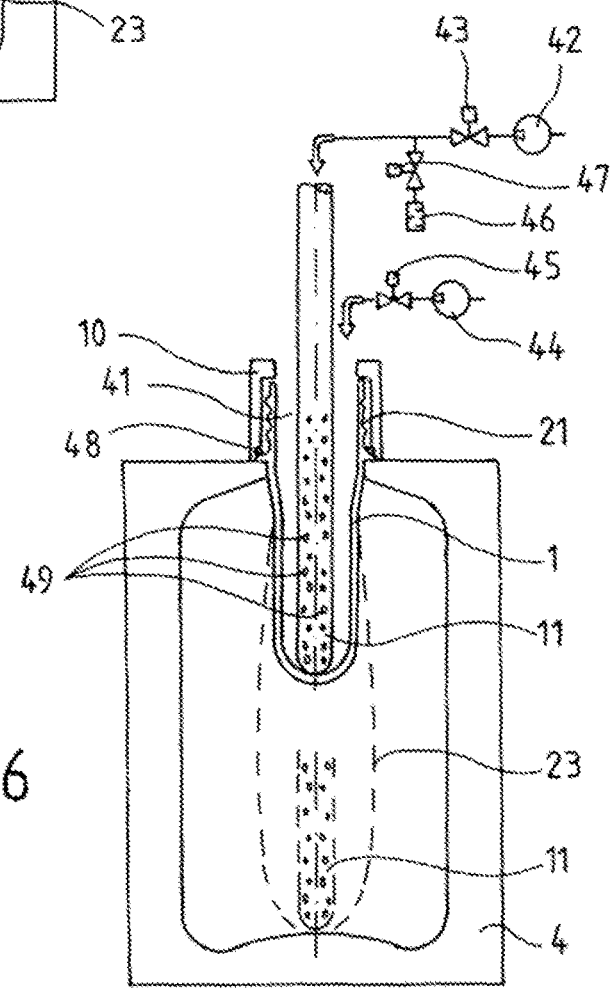
Figure 7:
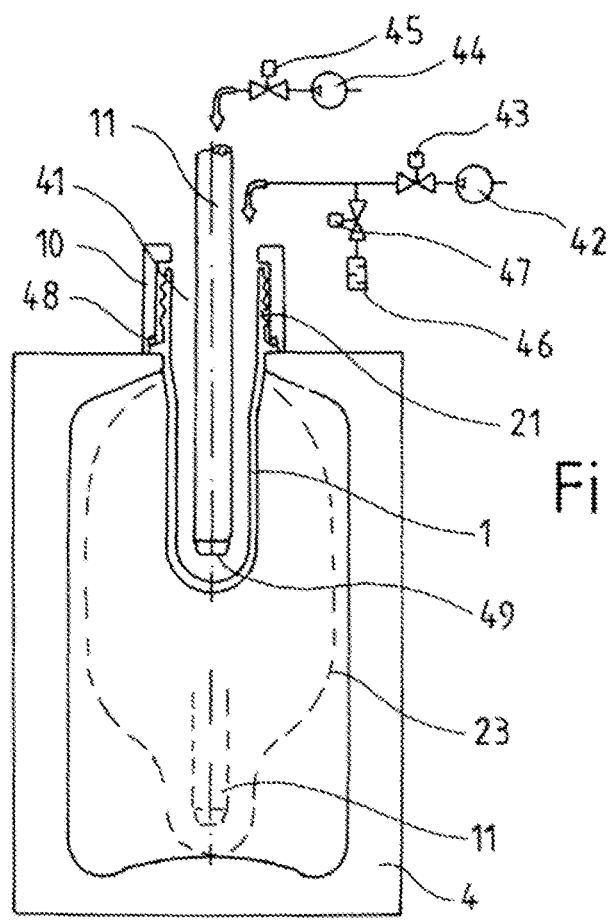
Figure 8:
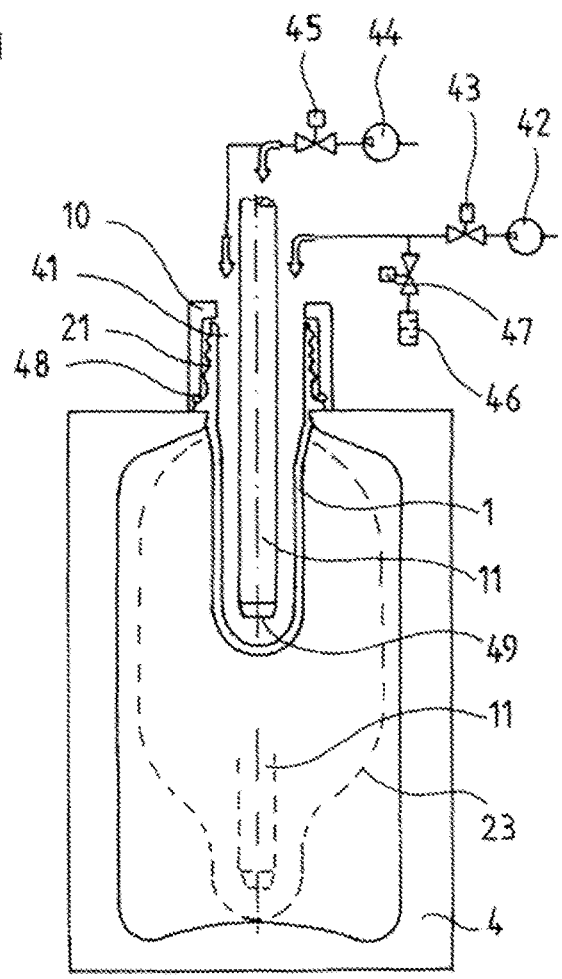
Figure 10:
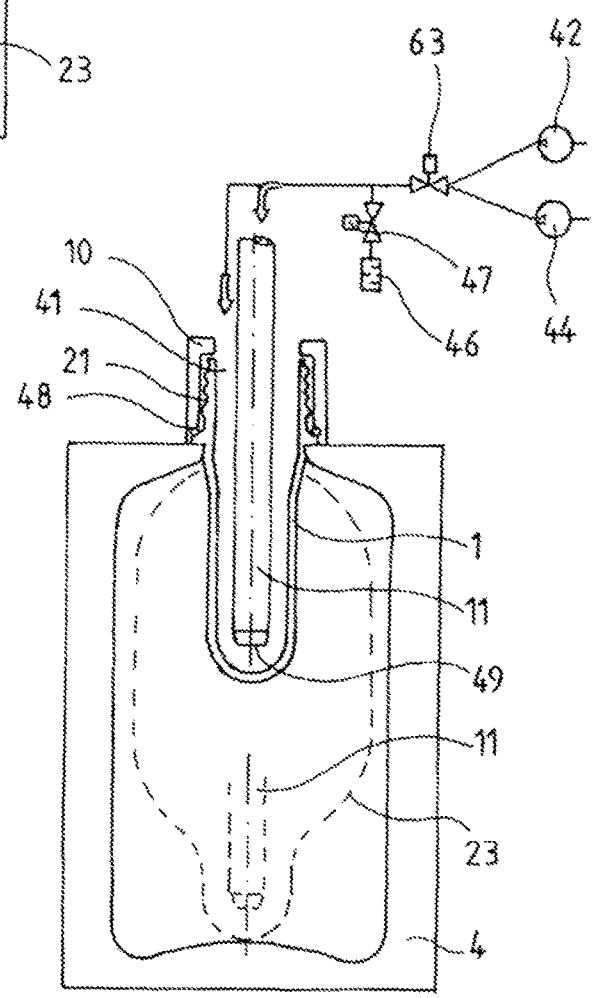

The drawings schematically show exemplary embodiment of the invention. In the drawings:

FIG. 1 shows a perspective view of a blowing station for producing containers out of preforms, FIG. 2 shows a longitudinal section through a blowing mold in which a preform is stretched and expanded, FIG. 3 shows a sketch for illustrating a basic construction of a device for the blowshaping of containers, FIG. 4 shows a modified heating section with increased heating capacity, FIG. 5 schematically shows the production of a container according to an embodiment of the invention, FIG. 6 schematically shows the production of a container according to another embodiment of the invention, FIG. 7 schematically shows the production of a container according to another embodiment of the invention, FIG. 8 schematically shows the production of a container according to another embodiment of the invention, FIG. 9 schematically shows the production of a container according to another embodiment of the invention, and FIG. 10 schematically shows the production of a container according to another embodiment of the invention.

The basic construction of a device in accordance with the invention for producing a container (2) filled with liquid product and consisting of a preform (1) is shown in FIG. 1 and FIG. 2. The arrangement can be as shown or can be rotated through 180° in a vertical plane.

The device for producing the container (2) consists substantially of a blowing station (3) that is provided with a blowing mold (4) into which a preform (1) can be inserted. The preform (1) can be an injection-molded part consisting of polyethylene terephthalate. In order to make it possible to insert the preform (1) into the blowing mold (4) and to make it possible to remove the finished container (2), the blowing mold (4) consists of mold halves (5, 6) and a bottom part (7) which can be positioned by a lifting device (8). The preform (1) can be held in the area of the blowing station (3) by a transport mandrel (9) which runs through, together with the preform (1), a plurality of treatment stations inside the device. However, it is also possible to insert the preform (1), for example by tongs or other manipulation means, directly into the blowing mold (4).

In order to make possible a compressed air supply line, a connection piston (10) is arranged underneath the transport mandrel (9) which piston supplies compressed air to the preform (1) and at the same time makes a seal relative to the transport mandrel (9). However, it is also conceivable in a modified construction to use fixed supply lines for compressed air.

A stretching of the preform (1) takes place in this exemplary embodiment with the aid of a stretching rod (11) which is positioned by a cylinder (12). According to another embodiment a mechanical positioning of the stretching rod (11) is carried out by cam segments loaded by adjustment rollers. The use of cam segments is especially advantageous if a plurality of blowing stations (3) are arranged on a rotating blowing wheel.

In the embodiment shown in FIG. 1 the stretching system is constructed in such a manner that a tandem arrangement of two cylinders (12) is made available. The stretching rod (11) is at first moved before the beginning of the actual stretching procedure by a primary cylinder (13) into the area of a bottom (14) of the preform (1). During the actual stretching procedure the primary cylinder (13) is positioned with extended stretching rod jointly with a carriage (15) carrying the primary cylinder (13) by a secondary cylinder (16) or by a cam control. In particular, the secondary cylinder (16) can be used with cam control in such a manner that a current stretching position is given by a guide roller (17) which slides along a curve path during the carrying out of the stretching procedure. The guide roller (17) is pressed by the secondary cylinder (16) against the guide path. The carriage (15) slides along two guide elements (18).

After a closing of the form halves (5, 6) arranged in the area of carriers (19, 20) a locking of the carriers (19, 20) relative to one another takes place with the aid of a locking device (40).

According to FIG. 2 the use of separate threaded inserts (22) is provided in the area of the blowing mold (4) for adaptation to different shapes of a mouth section (21) of the preform (1).

FIG. 2 shows, in addition to the blown container (2), also sketched in with dotted lines, the preform (1) and schematically shows a developing container bubble (23).

FIG. 3 shows the basic construction of a blowing machine provided with a heating section (24) and with a rotating blowing wheel (25). Starting from an introduction of preforms (26), the preforms (1) are transported by transfer wheels (27, 28, 29) into the area of the heating section (24). Heating radiators (30) as well as blowers (31) are arranged along the heating section (24) in order to temper the preforms (1). After a sufficient tempering of the preforms (1) they are transferred onto the blowing wheel (25) in whose area the blowing stations (3) are arranged. The finished, blown containers (2) are supplied by other transfer wheels to a discharge section (32).

In order to be able to shape a preform (1) into a container (2) in such a manner that that the container (2) has material properties that ensure a long usability of food, especially beverages, filled into the container (2), special method steps must be maintained during the heating and orienting of the preforms (1). Moreover, advantageous effects can be achieved by maintaining special dimensioning regulations.

Different plastics can be used as thermoplastic material. For example, polyethylene terephthalate (PET), polyethylene naphthalate (PEN) or polypropylene (PP) can be used.

The expansion of the preform (1) during the orientation process takes place by the supplying of fluid. The supplying of fluid is carried out in a pre-blowing phase in which gas, for example, compressed air, is supplied with a low pressure level and is divided into a following main blowing phase in which liquid product, for example, drinking water, is supplied with a higher pressure level. During the pre-blowing phase compressed air with a pressure in the interval of 10 bar to 25 bar is typically used, wherein the pre-blowing phase is already ended when the pressure in the developing container bubble has risen to 2 bar to 5 bar.

It can also be recognized from FIG. 3 that in the shown embodiment the heating section (24) is formed by a plurality of circulating transport elements (33) which are arranged on each other like a chain and are guided along deflection wheels (34). In particular, a substantially rectangular basic contour can be set up by the chain-like arrangement. In the embodiment shown, in the area of the expansion of the heating section (24) facing the transfer wheel (29) and an input wheel (35) an individual, relatively large-dimensioned deflection wheel (34) is used and in the area of adjacent deflections two comparatively smaller-dimensioned deflection wheels (36) are used. However, basically any other guides are conceivable.

In order to make possible the tightest possible arrangement of the transfer wheel (29) and of the input wheel (35) relative to one another, the arrangement shown proves to be especially advantageous since three deflection wheels (34, 36) are positioned in the area of the appropriate expansion of the heating section (24) wherein the smaller deflection wheels (36) are in the area of the transfer to the linear courses of the heating section (24) and the larger deflection wheel (34) is in the direct transfer area to the transfer wheel (29) and to the input wheel (35). It is also possible, for example, as an alternative to the using of chain-like transport elements (33) to use a rotating heating wheel.

After a finished blowing of the containers (2), they are guided out of the area of the blowing stations (3) by a removal wheel (37) and transported via the transfer wheel (28) and a discharge wheel (38) to the discharge section (32).

In the modified heating section (24) shown in FIG. 4 a greater amount of preforms (1) per unit of time can be tempered by the greater number of heating radiators (30). Blowers (31) conduct cooling air here into the area of cooling air conduits (39) which are located opposite the associated heating radiators (30) and emit the cooling air via outflow openings. A direction of flow for the cooling air that is substantially transverse to a transport direction of the preforms (1) is realized by the arrangement of the outflow directions. The cooling conduits (39) can make reflectors available for the radiation of heat in the area of surfaces opposite the heating radiators (30) and it is also possible to realize a cooling of the heating radiators (30) by the emitted cooling air.

A transport of the preforms (1) and of the containers (2) by the blowing machine can take place in different ways. According to a variant of an embodiment the preforms (1) are carried by transport mandrels at least along the substantial part of their transport path. However, it is also possible to perform a transport of the preforms (1) using tongs, which attack the outside of the preform (1), or to use inner mandrels which are introduced into a mouth area of the preform (1). Different variants are also conceivable regarding the spatial orientation of the preforms (1).

According to a variant the preform (1) is supplied oriented upward in the area of the preform input (26) with its mouth in the vertical direction and is subsequently rotated, transported oriented downward along the heating section (24) and the blowing wheel (25) with its mouth in a vertical direction and is rotated again as a blown and filled container (2) before reaching the discharge section (32). Corresponding transport means, for example, transport mandrels, have appropriate sealing devices in order to ensure that the product introduced during the blowing procedure remains in the container (2).

According to another variant the preform (1) is heated oriented downward area of the heating section (24) with its mouth in a vertical direction before reaching the blowing wheel (25) but again rotated through 180°.

According to a third variant of an embodiment the preform (1) or the container (2) runs through the entire area of the blowing machine oriented downward without making turning events with its mouth in a vertical direction.

The production in accordance with the invention of a container filled with the liquid product is explained in the following using the FIGS. 5 to 8.

FIG. 5 shows a blowing mold (4) in which a preform (1) is located. The preform (1) is arranged, for example, with its mouth section (21) facing upwards in the blowing mold (4). A connection piston (10), which is also designated as a blowing nozzle, is arranged above the mouth section (21) and seals the preform (1) by a seal (48). The blowing nozzle (10) defines a slot (41) through which blowing fluid is introduced into the preform (1). A stretching rod (11) is run through the slot (41) so that the slot (41) assumes a circular or an annular cross section as a function of the position of the stretching rod (11).

A compressed air guidance is connected or can be connected to the blowing nozzle (10) or to the slot (41) which guidance comprises a compressed air source (42) and a compressed air valve (43). In a pre-blowing phase compressed air is introduced from the compressed air source (42), controlled by the compressed air valve (43), into the preform (1). At the same time the preform (1) is stretched longitudinally and axially, i.e., along a longitudinal axis of the preform (1) by the stretching rod (11), which rests on a dome of the preform (1).

Under the action of the compressed air and of the stretching rod (11) a container bubble (23) develops which rests up to the end of the pre-blowing phase, for example, already in areas on the blowing mold (4). At this time, at which the stretching process has also been concluded and the stretching rod has arrived in a corresponding manner on the bottom of the blowing mold (4), the container bubble (23) is shown in FIG. 5 by way of example as a dotted line.

In a main blowing phase following the pre-blowing phase liquid product, for example, drinking water, is introduced from a product source (44) under pressure and controlled by a product valve (45) into the container bubble (23). The pressure of the product made available is greater than the internal pressure in the container bubble (23) so that the container bubble (23) is expanded further until it rests everywhere on the blowing mold (4). At this time the pressure inside the container bubble (23) rises further, wherein the pressure rise can be influenced, for example, by a purposeful controlling of an exhaust valve (47) and by appropriately letting out part of the blowing gas from the container bubble (23) via an exhaust (46). However, the main blowing phase can also take place without letting out blowing gas in order, for example, to achieve the most rapid pressure rise possible inside the container bubble (23).

The arrangement of the valves (43, 45, 47) shown in FIG. 5 is to be expressly understood as an example. Alternative solutions are also expressly comprised by the invention. For example, it is conceivable to control a compressed air source (42) and exhaust (46) by a single valve constructed, for example, as a switching valve. Likewise it is conceivable, as shown in FIG. 10 for example, to control the supply line of compressed air from the compressed air storage (42) and the product from the product storage (44) by a single valve constructed, for example, as a switching valve (63).

After the shaping of the container bubble (23) the container (2) is finished and can be removed after relieving the pressure via the exhaust (46) as a filled container from the blowing mold (4). The container (2) is advantageously closed before its removal in order, for example, to avoid a running out or splashing out of product from the container (2) during the removal.

Another embodiment of the invention is shown in FIG. 6. In this case the stretching rod (11) is constructed to be hollow and comprises several outlet openings (49) which empty in the lower range of the stretching rod (11) into the preform (1). This makes it possible to introduce the blowing fluids even through the stretching rod (11) into the preform (1).

In the example shown in FIG. 6 this is only the blowing gas, while the product moves, as already described for FIG. 5, via the slot (41) of the blowing nozzle (10) into the preform (1) or into the developing container bubble (23). This advantageously brings it about that both blowing fluids, i.e., the blowing gas on the one hand and the product and on the other hand, can be introduced via completely separate guide paths or supply lines into the preform (1). This excludes a mixing of the blowing fluids in the supply lines.

Independently of the variation in the supply lines of the blowing fluids, FIG. 6 additionally shows an advantageous variant of the method of the invention. In it the preform (1) is stretched during the pre-blowing phase in the entire longitudinal axial extent but is expanded only very little radially or transversely to the axle by a correspondingly small supply of blowing gas. This prevents that material of the developing container bubble (23) comes to rest on the stretching rod (11) but the volume of the container bubble (23) remains as small as possible at the end of the pre-blowing phase. This brings it about that the material from the preform (1) is already distributed in a controlled manner along the longitudinal axis and yet at the beginning of the main blowing phase a rapid filling of the container bubble (23) with the incompressible product is achieved and with it a rapid pressure rise inside the container bubble (23). In this manner a good distribution of material is combined with a rapid main blowing process, which is advantageous in particular as regards the cooling off of the material upon contact with the product.

Another variant of the invention is shown in FIG. 7. This variant differs from the variant shown in FIG. 6 mainly in that the blowing gas is supplied via the blowing nozzle (10) and the product is supplied via the hollow stretching rod (11). Moreover, the hollow stretching rod (11) comprises a single exit opening (49) directed downward in the direction of the container bottom. This embodiment of the hollow stretching rod (11) is advantageous as concerns the flow dynamics for incompressible fluids such as the product but makes it necessary that the stretching rod (11) is lifted at least slightly after the ending of the stretching process and before the beginning of the main blowing phase in order to make possible a flowing out of the product.

The shown embodiments of the hollow stretching rod (11) are basically to be understood as examples. In principle, even a combination of lateral outflow openings (49) with the central outflow opening (49) on the tip of the stretching rod is conceivable. In addition, any embodiments of a hollow stretching rod can be used in the scope of the invention for introducing a blowing gas and also for introducing a product.

FIG. 8 shows a fourth embodiment of the invention, wherein in this case the product is supplied and introduced via the blowing nozzle (10) and also via the hollow stretching rod (11). As a result the cross section or line cross section available for introducing the product is increased so that an elevated volume flow can be realized for the product.

This can also be achieved, for example in that the stretching rod (11) is withdrawn after the ending of the stretching process so that the cross-sectional area of the slot (41) in the blowing nozzle (10) is increased. Both variants can also be combined, wherein, for example, product is introduced through the hollow stretching rod (11) and the blowing nozzle (10) but the stretching rod (11) is moved in parallel in order to enlarge the slot (41) in the blowing nozzle (10).

The invention claimed is:

1. A method for producing a container filled with a liquid product from a thermally conditioned preform made of a thermoplastic material, the method comprising steps of:
   stretching the preform in a blowing form with a stretching rod; and
   inflating the perform in the blowing form to form the preform into the container and fill the container with the liquid product;
   wherein the inflating step includes introducing a first fluid at a first pressure level into the preform in a pre-blowing phase, and introducing a second fluid at a second pressure level that is greater than the first pressure level into the preform in a main blowing phase,
   wherein the first fluid is a blowing gas,
   wherein the second fluid is the liquid product,
   wherein the blowing gas comprises a mixture of at least two different supplied gases,
   wherein one of the at least to different supplied gases is carbon dioxide, and
   wherein at least a part of the carbon dioxide in the blowing gas separates out of the blowing gas and carbonates the liquid product in container at a conclusion of the main blowing phase.

2. The method according to claim 1, wherein the blowing gas is introduced through one or more of:
   a slot in an area of a mouth section of the preform or a developing container bubble; and
   an inner hollow space of the stretching rod into an inner hollow space of the preform or the developing container bubble.

3. The method according to claim 1, wherein the liquid product is introduced through one or more of:
   a slot in an area of a mouth section of the preform or a developing container bubble; and
   an inner hollow space of the stretching rod into an inner hollow space of the preform or the developing container bubble.

4. The method according to claim 1, wherein the method further comprises:
   closing the container in the blowing form after the conclusion of the main blowing phase; and
   removing the closed container from the blowing form.

5. A device for producing a container filled with a liquid product, said device comprising:
   a heating device for thermal conditioning a preform made of a thermoplastic material; and
   a blowing device for shaping the thermally conditioned preform to form the container;
   wherein the blowing device comprises a blowing mold for receiving the preform, a stretching rod for stretching the preform received in the blowing mold, and supply means for introducing a blowing gas and the liquid product into an inner hollow space of the preform received in the blowing mold,
   wherein the supply means comprises a first supply line configured to supply the blowing gas into the preform in a pre-blowing phase, and a second supply line configured to supply the liquid product into the preform in a main blowing phase,
   wherein the device further comprises a mixing device connected in a flow-conducting manner to the first supply line for mixing different gases from at least two different gas sources together as the blowing gas,
   wherein one of the at least to different gases is carbon dioxide, and
   wherein the device is configured to cause at least a part of the carbon dioxide in the blowing gas to separate out of the blowing gas and to carbonate the liquid product in container at a conclusion of the main blowing phase.

6. The device according to claim 5, wherein the blowing device comprises a blowing nozzle for sealing the preform received in the blowing mold such that the inner hollow space of the preform is sealed, and wherein the inner hollow space of the preform is connectable in a flow-conducting manner by the blowing nozzle to either one or both of the first supply line and the second supply line.

7. The device according to claim 5, wherein the stretching rod is hollow, and wherein the inner hollow space of the preform received in the blowing mold is connectable in a flow-conducting manner to either one or both of the first supply line and the second supply line.

8. The device according to claim 5, wherein the device further comprises:
- a switching valve having an input side to which the first supply line and the second supply line are connected; and
- a third supply line connected to an output side of the switching valve;
- wherein the third supply line is configured to supply gases as well as to supply liquids, and
- wherein the inner hollow space of the preform received in the blowing mold is connectable in a flow-conducting manner to the third supply line by either one or both of a blowing nozzle and a hollow stretching rod.

9. The device according to claim 5, wherein the device further comprises a closing device for closing the container after it has been filled with liquid product.

10. The device according to claim 9, wherein the closing device is configured to close the container after the container has been filled with liquid product and while the container is received in the blowing mold.

* * * * *